(12) United States Patent
Conner et al.

(10) Patent No.: US 7,015,991 B2
(45) Date of Patent: Mar. 21, 2006

(54) COLOR PRE-FILTER FOR SINGLE-PANEL PROJECTION DISPLAY SYSTEM

(75) Inventors: Arlie R. Conner, Portland, OR (US); Gary B. Kinglsey, Beaverton, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/302,405

(22) Filed: Nov. 21, 2002

(65) Prior Publication Data

US 2003/0117546 A1 Jun. 26, 2003

Related U.S. Application Data

(60) Provisional application No. 60/343,105, filed on Dec. 21, 2001.

(51) Int. Cl.
*G02F 1/1335* (2006.01)
(52) U.S. Cl. ............................ 349/106; 349/104; 349/5
(58) Field of Classification Search ................ 349/106, 349/104, 105, 5
See application file for complete search history.

(56) References Cited

U.S. PATENT DOCUMENTS

| | | | |
|---|---|---|---|
| 5,548,422 A | 8/1996 | Conner et al. | |
| 5,682,216 A | 10/1997 | Lin et al. | |
| 5,737,045 A | 4/1998 | Abileah | |
| 5,751,385 A | 5/1998 | Heinze | |
| 5,751,388 A * | 5/1998 | Larson | 349/96 |
| 5,986,815 A * | 11/1999 | Bryars | 359/634 |
| 6,452,646 B1 | 9/2002 | Sharp et al. | |

OTHER PUBLICATIONS

G. D. Sharp and J. R. Birge, "Retarder Stack Technology for Color Manipulation," SID Symposium, vol. 30, (Apr. 1999) p 1072.

* cited by examiner

*Primary Examiner*—Toan Ton
(74) *Attorney, Agent, or Firm*—George W. Jonas (57) ABSTRACT

A single-panel LCD projection system includes a color prefilter positioned between an illumination system and a multi-color liquid crystal display (LCD). The color prefilter functions to shape the spectrum of illumination provided by the illumination system so as to increase relative panel transmission and to reduce heat absorption by color component filters (e.g., red, green and blue) incorporated in the LCD. The color prefilter is selected to eliminate from or greatly reduce in the illumination light the intensity of certain wavebands that do not materially contribute to generating pure primary colors. A consequence of adding the color prefilter is that the LCD color component filters can be desaturated and the overall total transmission of the projection system can be improved. In one implementation, the color prefilter is able to remove the wavebands of highest absorption by the LCD color component filters before such light strikes the LCD, so that there is less heat build-up in the LCD.

15 Claims, 7 Drawing Sheets

COLOR PRE-FILTER FOR SINGLE-PANEL PROJECTION DISPLAY SYSTEM

This application claims the benefit of Provisional Application No. 60/343,105, filed Dec. 21, 2001.

BACKGROUND AND SUMMARY OF THE INVENTION

Figure 1:
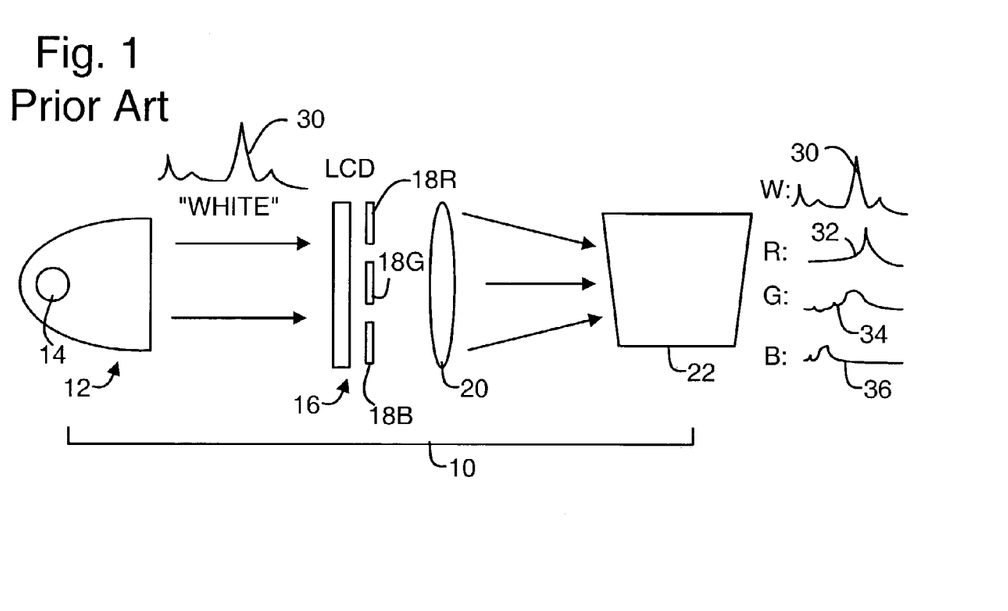
FIG. 1 illustrates a conventional prior art lowest-cost single-panel LCD projection system that uses a brute force method to create color.

FIG. 1 illustrates a conventional prior art low-cost single-panel LCD projection system 10 that uses a brute force method to create color.

An illumination system 12 with a light source 14 provide uniform illumination of an multi-color liquid crystal display (LCD) 16, which has embedded color filters 18R, 18G, and 18B corresponding to red, green and blue primary color components. Color filters 18R, 18G, and 18B are aligned over individual sub-pixels (not shown) of LCD 16.

Each subpixel is independently addressable so that the liquid crystal molecules of LCD 16 can be driven to certain tilt angles as is known in the art, to effect varying degrees of light transmission intensity. With appropriate associated polarizers, for example, this varies the red, green and blue subpixel intensities to provide a generally full color image. Projection optics 20, which are represented schematically, project the color image to a display screen 22.

Problems with this brute force approach are a low transmission rate, especially when color filters are highly saturated, so as to yield good (i.e. pure) color primaries, or poor color saturation (yielding impure color primaries) to increase transmission rate. In addition, this approach also causes heating within the LCD panel due to absorption by the color filters. Typically, the absorption of green light by the red color component filter 18R is inevitable. Likewise, a blue color component filter 18B passes mainly just blue light and green filter 18G passes mainly just green light. Thus the majority of the illumination light (i.e., ⅔ of total) is absorbed by the color component filters 18R, 18G, and 18B. Simplified diagrams of light spectra illustrate generally a spectrum 30 for polychromatic ("white") light provided by light source 14 and the resulting spectra 32, 34, and 36 of respective red, green, and blue color components generated by projection system 10.

The present invention addresses all three of these problems, by providing a color prefilter, positioned between the light source and the LCD panel, to shape the spectrum of the illumination so as to increase the relative panel transmission and to reduce the heat absorption within the LCD embedded color filters.

The present invention includes a single-panel LCD projection system that includes a color prefilter positioned between an illumination system and a multi-color liquid crystal display (LCD) having an associated polarizer and analyzer. The color prefilter functions to shape the spectrum of illumination provided by the illumination system so as to increase relative panel transmission and to reduce heat absorption by color component filters (e.g., red, green and blue) incorporated in the LCD.

The color prefilter is selected to eliminate from or greatly reduce in the illumination light the intensity of certain wavebands that do not materially contribute to generating pure primary colors. A consequence of adding the color prefilter is that the LCD color component filters can be desaturated and the overall total transmission of the projection system can be improved. In one implementation, the color prefilter is able to remove the wavebands of highest absorption by the LCD color component filters before such light strikes the LCD, so that there is less heat build-up in the LCD.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 2:
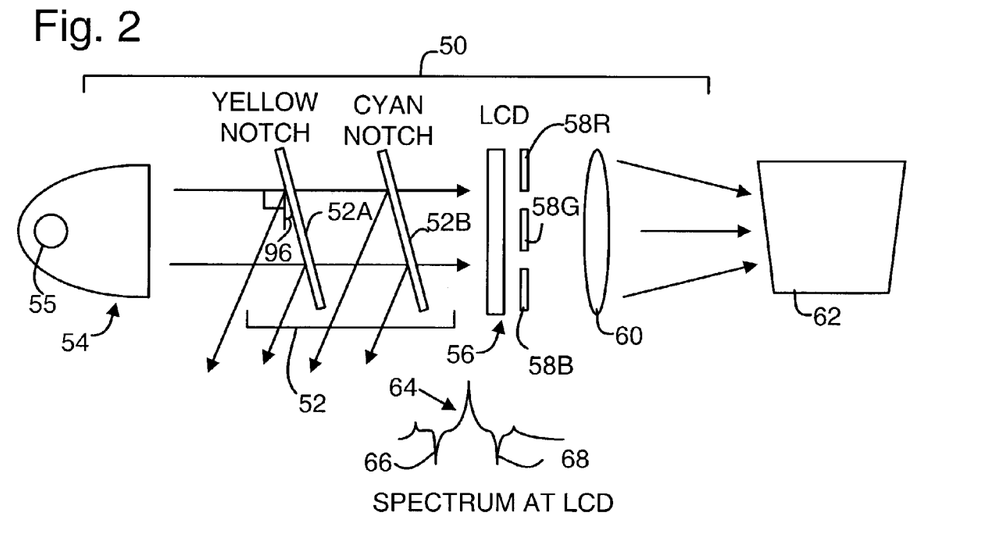
FIG. 2 illustrates a single-panel LCD projection system of the present invention having a prefilter positioned between an illumination system and a multi-color liquid crystal display (LCD).

FIG. 2 is a simplified illustration of a single-panel LCD projection system 50 that includes a prefilter 52 positioned between an illumination system 54 and a multi-color liquid crystal display (LCD) 56 including an associated polarizer and analyzer (not shown). Illumination system 54 includes a light source 55, and LCD 56 includes embedded color filters 58R, 58G, and 58B corresponding to red, green and blue primary color components. Prefilter 52 functions to shape the spectrum of illumination provided by illumination system 54 so as to increase relative panel transmission, thereby reducing heat absorption by color component filters 58 incorporated in LCD 56. Projection optics 60, which are represented schematically, project the color image to a display screen 62.

Prefilter 52 is selected to eliminate from or greatly reduce in the illumination light the intensity of certain wavebands that do not materially contribute to generating pure primary colors. A consequence of the filtering provided by prefilter 52 is that the LCD color filters 58 can be desaturated, and the overall total transmission of projection system 50 can be improved. In one implementation, the prefilter 52 is able to remove the wavebands of highest absorption by color component filters 58 before such light strikes the LCD 56, so that there is less heat-up in the LCD 56.

The prefilter 52 shapes the light spectrum from illumination system 54 source into distinct red, green, and blue subbands. Hence prefilter 52 is configured to have steep transmission edges around two notches, located around 500 and 590 nm regions of the visible spectrum (commonly specified as 400 to 700 nm). Color purity for red, green, and blue primaries can be arbitrarily improved by increasing the prefilter notch bandwidths. A simplified diagram of a spectrum 64 of polychromatic light provided to LCD 56 with chromatic "notches" 66 and 68 that illustrate the filtering or blocking of respective cyan and yellow color components by prefilter 52.

Figure 3:
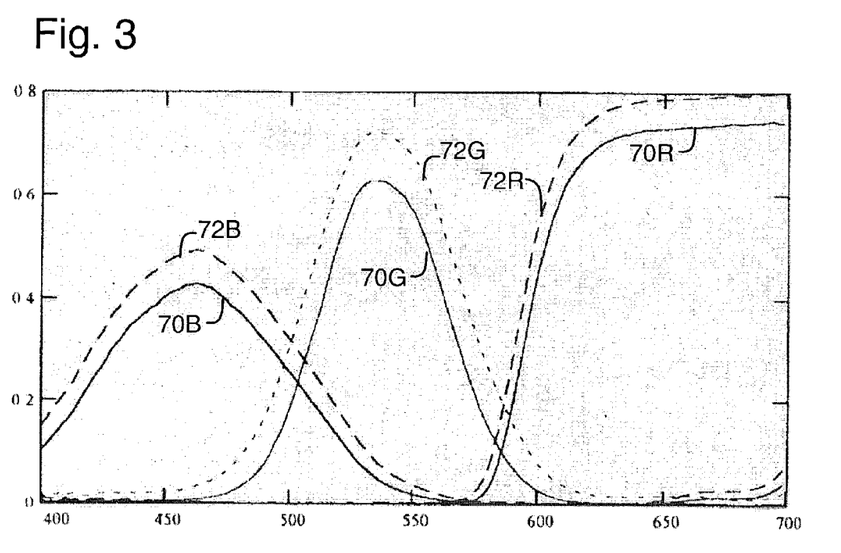
FIG. 3 is a graph illustrating transmissivities of conventional color component filters and transmissivities of desaturated color component filters that can be employed in combination with a prefilter of this invention.

FIG. 3 is a graph illustrating as a solid lines 70R, 70G, and 70B transmissivities of conventional color component filters 58R, 58G, and 58B. Dashed lines 72R, 72G, and 72B illustrate transmissivities of desaturated color component filters 58R, 58G, and 58B that can be employed in combination with prefilter 52. Notice the significantly higher transmission rates 72R, 72G, and 72B of the desaturated color component filters 58R, 58G, and 58B in comparison to conventional transmission rates 70R, 70G, and 70B. However, if used without prefilter 52, the desaturated filters supported by the present invention would typically have much worse color saturation values.

Figure 4:
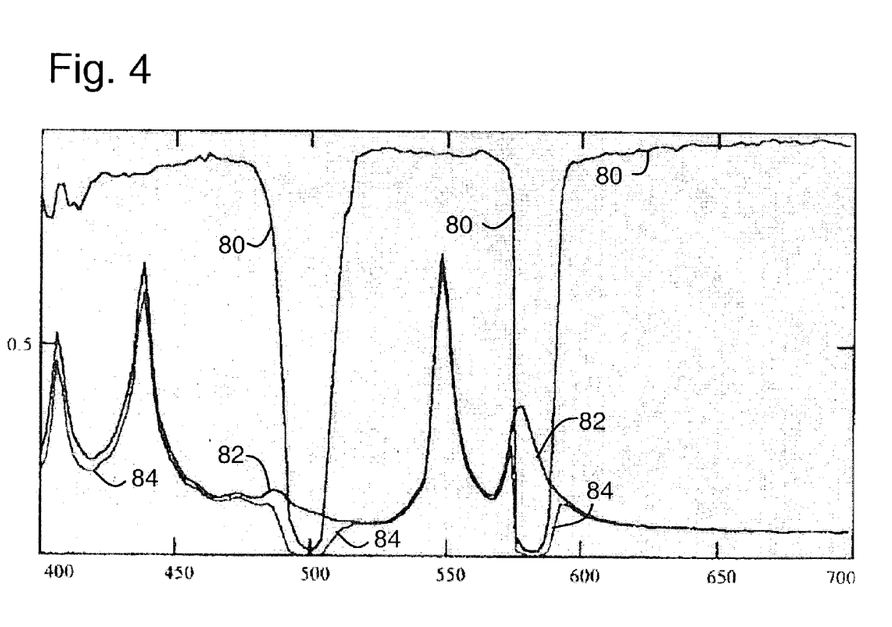
FIG. 4 is a graph illustrating transmission of one implementation of a twin-notch prefilter in relation to a spectrum of illumination light.

FIG. 4 is a graph illustrating transmission 80 of one implementation of a twin-notch prefilter 52 in relation to a spectrum 82 of one implementation of illumination light. A spectrum 84 represents the product between transmission 80 and spectrum 82 and corresponds to the result of the illumination light passing through the twin-notch prefilter 52. Spectrum 84 illustrates significantly reduced light intensities 86A and 86B at at extraneous wavebands corresponding to respective notches 88A and 88B in transmissivity of prefilter 52.

Figure 5:
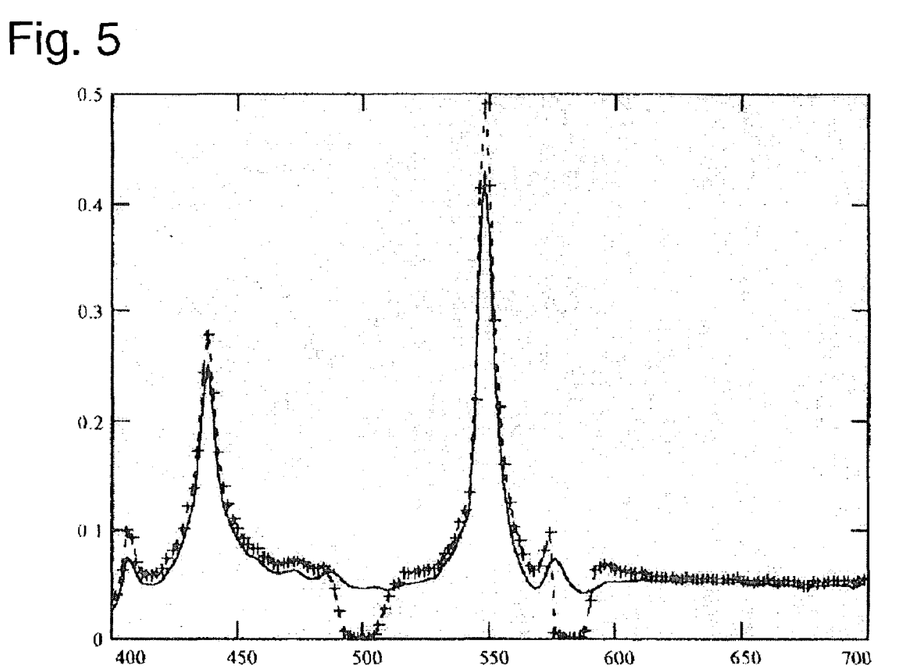
FIG. 5 is a graph showing a white (fully ON, i.e. maximum transmission) state for projection display systems with and without a prefilter of this invention.
Figure 6:
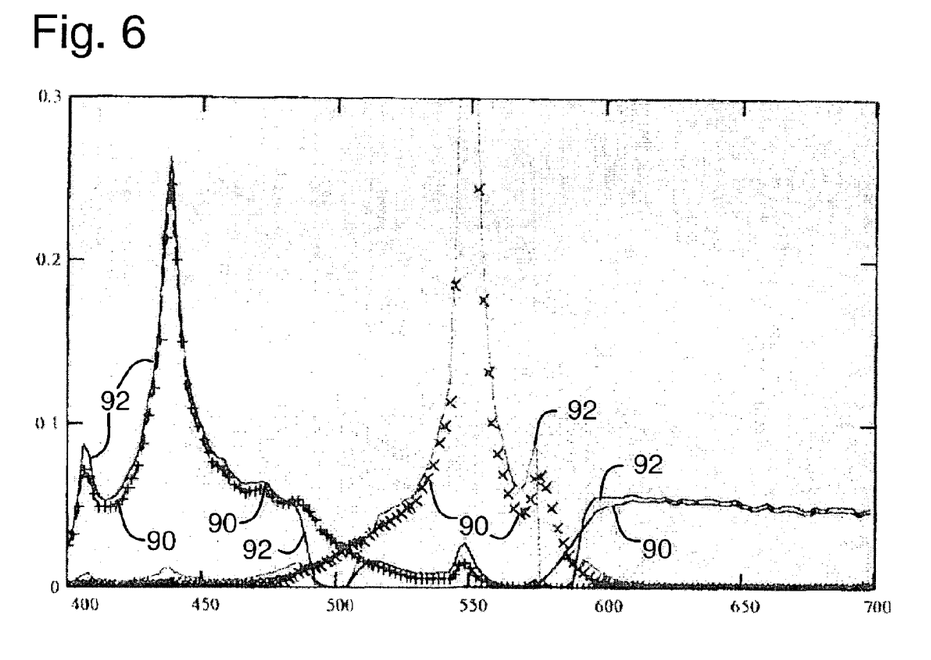
FIG. 6 is a graph showing the R, G and B values (plotted together) for projection display systems with and without a prefilter of this invention.

FIG. 5 is a graph showing a white (fully ON, i.e. maximum transmission) state for an exemplary prior art projection 10 (indicated by solid line) and a projection system 50 according to the present invention (indicated by "+" symbols with intervening dashes). FIG. 6 is a graph showing red, green and blue transmissivities in an exemplary prior art projection 10 (indicated by plots 90—generally other than solid lines) and a projection system 50 according to the present invention (indicated by plots 92—solid lines). The graphs of FIGS. 5 and 6 are the result of multiplication of illumination (source) spectra with individual red, green, and blue filtering, including the notch filter transmission for projection systems 50. Multiplications are performed point-by-point for each spectral position with a model using 2 nm sample points, for example.

When a conventional color filtered LCD 16 is used for projection, most of the illuminating light is absorbed by the color filter matrix 18. Even with high transmission type color filters 18, the LCD panel 16 passes only about 16% of the light that passes through the incident polarizing filter. This transmission is characteristic of a LCD panel 16 that operates in a twisted nematic mode and in which the liquid crystal cell is sandwiched between an incident polarizer and an outgoing analyzer.

With reference to prior art projection system 10 of FIG. 1, the illumination spectrum is passed independently through the red, green and blue filters and then combined at the screen (or by an observer's eye in a direct display) to form a full color image. The mathematical representation is simply Illuminant*($R+G+B$)=Screen spectrum.

In order to portray television signals, the color primaries can be observed by analyzing the sub-channel spectra may be represented as:

Illuminant*R

Illuminant*G, and

Illuminant*B

Each of color filters 18R, 18B, and 18G can in theory be darkened until it gives sufficient color purity so that specified primary red, green, and blue colors specified by SMPTE (Society of Motion Picture and Television Engineers) for HDTV can be projected onto display screen 22. For example, the dyestuff or pigment used for color filters 18 can be concentrated or layered in thicker fashion during fabrication to allow such highly saturated primary colors, but such purity will be accompanied by a strong loss of transmissivity. An equally problematic consequence of such color-enhanced filters is a significant absorption of the illumination power, which will lead to heating of the color filter layer 18 and the entire LCD 16.

It is difficult to remove such heat from the glass substrates of the LCD 16—because glass is not a very good thermal conductor. As a result, some residual problems can remain. U.S. Pat. No. 5,682,216 describes use of a plastic film made of TAC (Tri-Acetyl Cellulose) to reduce or eliminate thermals from showing up as image artifacts.

Figure 7:
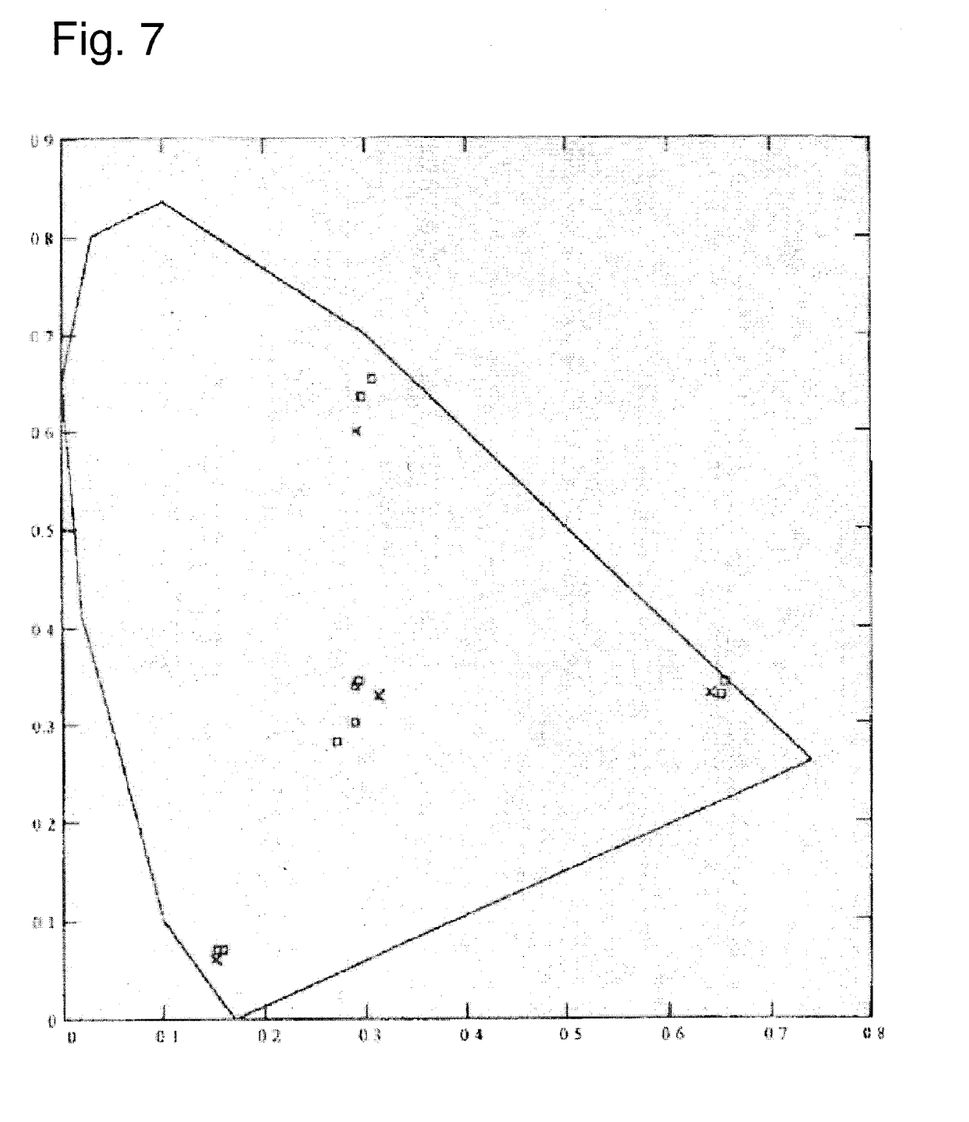
FIG. 7 is a CIE chromaticity diagram plotting the color characteristics projection display systems with and without a prefilter of this invention relative to HDTV color standards.

In this context, the positioning of prefilter 52 in front of LCD 56, and lighter color filters 58, can help reduce heating of the LCD 56. Table 1 below compares such a projection system 50 with a prefilter 52 and lighter color filters 58 with the prior art projection system 10 (with conventional color filters and no prefilter). FIG. 7 is a CIE chromaticity diagram plotting the color characteristics of a system 50 and a prior system 10 (indicated by "square" data points) relative to HDTV standard color parameters (indicated by "x: data points).

TABLE 1

|  | Prior Art | This Invention, with prefilter using 2 notches |
|---|---|---|
| Red | x = 0.65 | x = 0.65 |
|  | y = 0.34 | y = 0.33 |
| Green | x = 0.31 | x = 0.30 |
|  | y = 0.65 | y = 0.63 |
| Blue | x = 0.15 | x = 0.16 |
|  | y = 0.07 | y = 0.07 |
| White | x = 0.29 | x = 0.29 |
|  | y = 0.34 | y = 0.34 |
| Transmittance | 15.6% | 16.5% |
| Absorption | 84.4% | 78.1% |

Table 1 illustrates that nearly ideal color primaries can be obtained with either system. Both systems are based on commercially available color filters and a Philips UHP 100

W lamp. Equally good color primaries are obtained with the prefiltered (double-notch filtered) UHP source and lighter color filter set. There is an improvement in overall transmission for the prefiltered system of approximately 5%.

The prefiltered panel absorbs 78% of the prefiltered illumination energy, whereas the conventional system with nonfiltered source has the LCD absorbing 84% of the illumination. Moreover, the prefilter causes a reduction of light incident at the LCD of about 25%, so that the amount of optical power absorbed by the LCD with lighter color filter set is reduced to (78*75=) 58.5% of the original lamp's power. Not only is the prefiltered system brighter, but the absorbed energy in the LCD is reduced to only about 75% of that for the nonfiltered system.

The notch filters 52A and 52B can be made as two independent layers or devices for easier angle-tuning in mass production, or if sufficient repeatability can be had, combined as a single prefilter unit 52 for a lower parts count and slightly higher transmission due to elimination of surfaces. Angle-tuning refers to sensitivity that interference filters have with angle of incidence. We can simply tilt the filter 5 to 15 degrees to adjust the notch band (toward the blue with increasing angle). In one implementation, filters 52A and 52B may be formed to be oriented at an angle of incidence 96 (FIG. 2) of about 10 degrees, thereby allowing the angle of each filter to be adjusted +/−10 degrees to "angle-tune" each filter separately.

Other degrees of freedom are also available for perfecting the color primaries with the prefiltered projection system 50. Although the edges of the notches 66 and 68 (FIG. 2) of prefilter 52 are intertwined with the red, green, and blue color purities, the yellow notch 68 (590 nm) has substantially no effect on blue primary color value, and the cyan notch 66 (500 nm) has substantially no effect on red color purity. The 490 nm to 495 nm edge of the cyan notch 66 affects the blue color purity strongly and the green color purity only very slightly, whereas the 505 to 510 nm edge of the cyan notch 66 affects the blue color somewhat and the green primary value strongly. Likewise the 570 nm to 575 nm edge of the yellow notch 68 affects the green primary strongly and should not effect the red purity at all, while the 585 nm to 590 nm edge of the yellow notch 68 affects the red primary color strongly and has only a small effect on the green color purity.

The prefiltered projection system 50 allows a designer to treat saturation of embedded color filters 58 as a variable in which one can individually densify or lighten the saturation of color component filters 58R, 58G, 58B. At the same time one can also design the prefilter 52 to narrow or widen the two notch regions 66 and 68 and adjust placement of all four of the notch edges. By iterating one can find optimal transmission for the entire system, lessened absorption in the color filters 58, and precise RGB color points as specified by display or television standards (e.g., SMPTE HDTV)

The typical light source for projection TV is a high pressure mercury discharge lamp, which has a known deficiency in red wavelengths and strong peak in mid-green region, at 546 nm. The embodiment of FIG. 2 uses two prefilters 52A and 52B (as shown) located in front of this lamp, with a parabolic reflector, for example. Both filters 52A and 52B may be slightly tilted to adjust wavelength range to accommodate variations in mass production of such filters.

In one implementation, prefilters 52A and 52B are made from holographic materials, dichromated gelatin (DCG), due to excellent edge characteristics and low cost. Furthermore such DCG materials have excellent reliability and performance with strong light incidence. Preferably there is a UV rejection filter placed immediately ahead of the prefilter 52 to practically eliminate damaging ultraviolet light.

Figure 8:
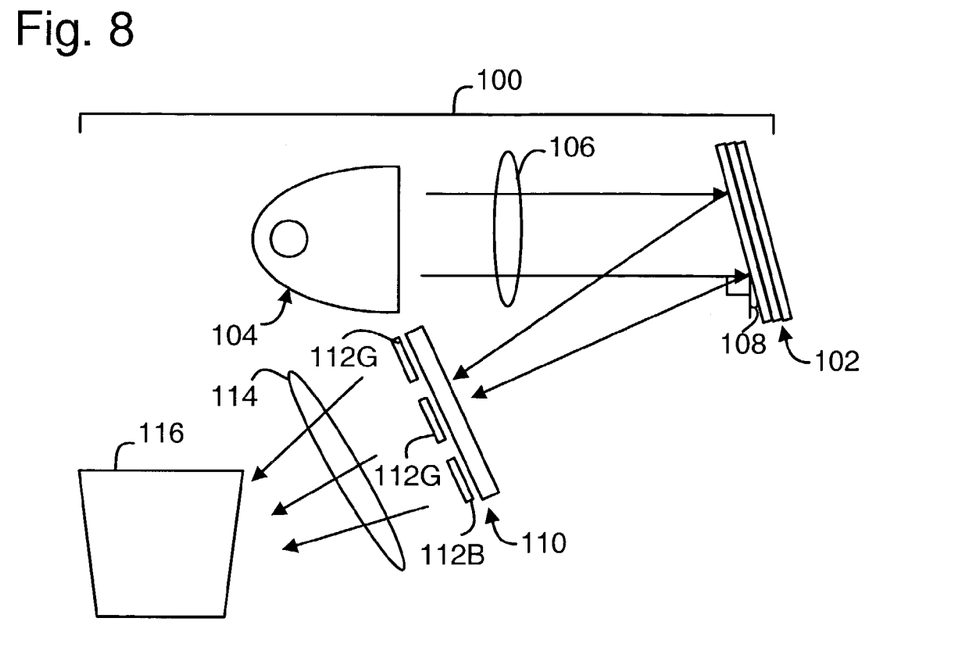
FIG. 8 is a simplified illustration of a single-panel LCD projector system with a reflective triple band prefilter as another implementation of the present invention.

FIG. 8 is a simplified illustration of a single-panel LCD projector system 100 as another implementation of the present invention. A reflective triple band prefilter 102 receives illumination light from an illumination system 104 via a collimating lens 106. Reflective triple band prefilter 102 is tilted at an angle of incidence 108 to reflect specific or tuned primary color bands (e.g., red, green, and blue) at an inclined angle to a multi-color liquid crystal display (LCD) 110 including an associated polarizer and analyzer (not shown) and color component filters 112R, 112G, and 112B. Illumination system 104 and LCD 110 may be substantially the same as illumination system 54 and LCD 56. Projection optics 114, represented schematically, project a display image to a display screen 116.

Prefilter 102 functions in a manner analogous to that of prefilters 52 (FIG. 2). In particular, reflective triple band prefilter 102 and transmissive notch filters 52 shape the spectrum of illumination provided by an illumination system and direct color-tuned illumination light toward an LCD.

Transmissive notch filters 52 omit undesired yellow and cyan light components by reflecting them away from the LCD 56. By selectively reflecting tuned red, green and blue light components toward the LCD 110, reflective triple band prefilter 102 omits undesired yellow and cyan light components by absorbing them or transmitting them away from LCD 110. As a result, reflective triple band prefilter 102 increases relative panel transmission and reduces heat absorption by color component filters 112 incorporated in LCD 110 in the manner described above for transmissive notch filters 52. An aspect of single-panel LCD projection system 100 is that color-tuned reflective filters, such as reflective triple band prefilter 102, can be easier to manufacture than color-tuned transmissive notch filters, such as transmissive notch filters 52.

Figure 9:
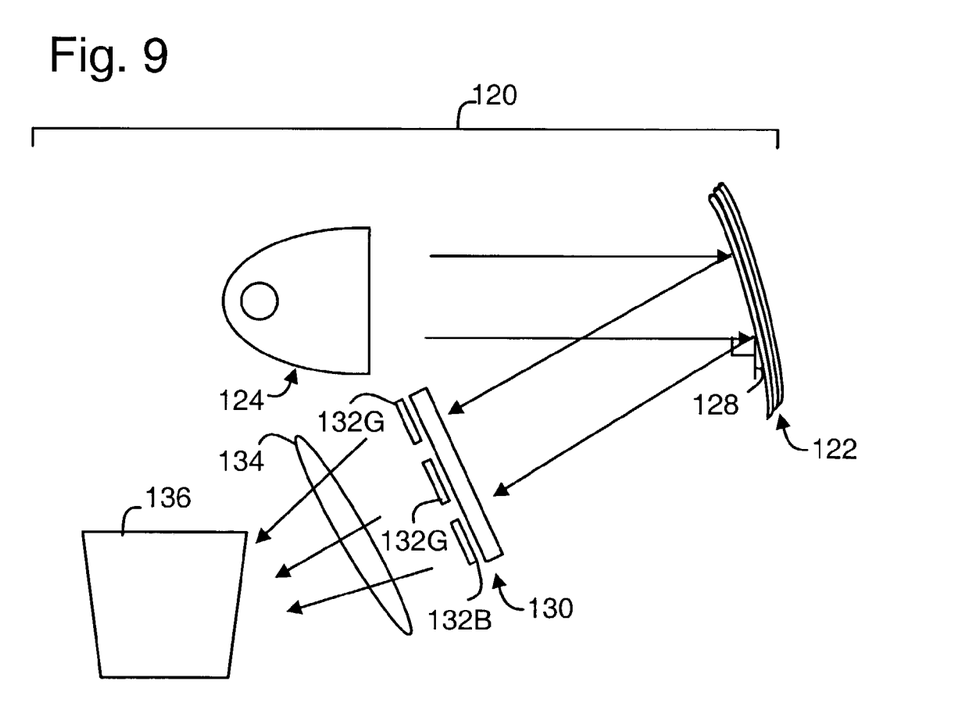
FIG. 9 is a simplified illustration of a single-panel LCD projector system with a reflective triple band prefilter on a concave substrate as yet another implementation of the present invention.

FIG. 9 is a simplified illustration of a single-panel LCD projector system 120 as yet another implementation of the present invention. A reflective triple band prefilter 122 on a concave substrate receives illumination light from an illumination system 124. Reflective triple band prefilter 122 is tilted relative to an angle of incidence 128 to reflect specific or tuned primary color bands (e.g., red, green, and blue) at an inclined angle back to a multi-color liquid crystal display (LCD) 130 including an associated polarizer and analyzer (not shown) and color component filters 132R, 132G, and 132B.

Projection system 120 is substantially the same as projection system 100, except that except the former substitutes a concave substrate for collimating lens 106 to provide convergence of color-tuned illuminating light directed to LCD 130. Projection optics 134, represented schematically, project a display image to a display screen 136.

Figure 10:
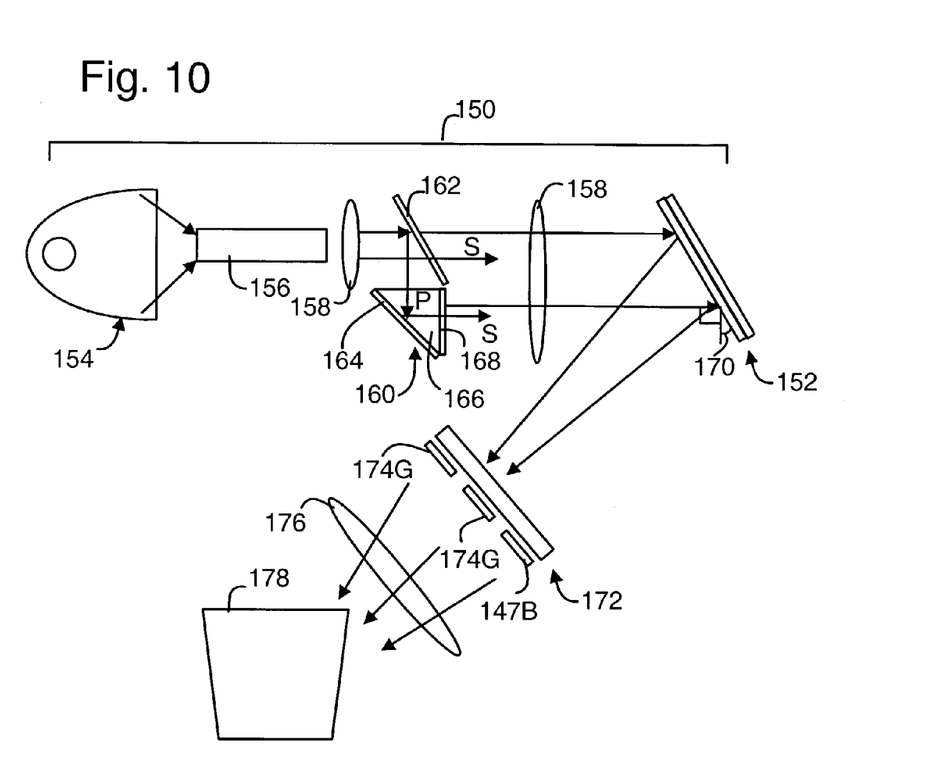
FIG. 10 is a simplified illustration of a single-panel LCD projector system a polarization conversion system (PCS) as another implementation of the present invention.

FIG. 10 is a simplified illustration of a single-panel LCD projector system 150 as another implementation of the present invention. A reflective triple band prefilter 152 receives illumination light from an illumination system 154 via a light pipe integrator 156 (hollow or solid), relay optics 158 and a polarization conversion system (PCS) 160. PCS 160 receives uniform illumination of arbitrary polarization and transmits light with a selected polarization (e.g., S-polarized) with minimal attenuation.

For example, PCS 160 includes a supported dielectric film 162 that is polarization selective and generally achromatic.

One of S- and P-polarized light is transmitted through dielectric film 162 (e.g., S-polarized light), and the other of the S- and P-polarized light (e.g., P-polarized light) is reflected to a dielectric film 164 on an adjacent inclined face of a prism 166 to be reflected outward through a half-wave retarder 168. Half-wave retarder 168 converts the reflected S-polarized light to P-polarized light, so that all light passing from PCS 160 is of a single polarization (e.g., S-polarization).

Reflective triple band prefilter 152 may be formed of gradient filters that preferentially reflect the primary color components red, green, and blue at, for example, an angle 170 of 45 degrees from the angle of incidence. In one implementation, a magenta filter may be substituted for the red and blue gradient filters to form the equivalent of a double-notch filter. In either implementation, the gradient filters may be formed on separate substrates or on a common substrate. Prefilter 152 reflects the color-filtered light to a LCD 172 with color component filters 174R, 174G, and 174B, and projection optics 176 project a display image to a display screen 178.

Figure 11:
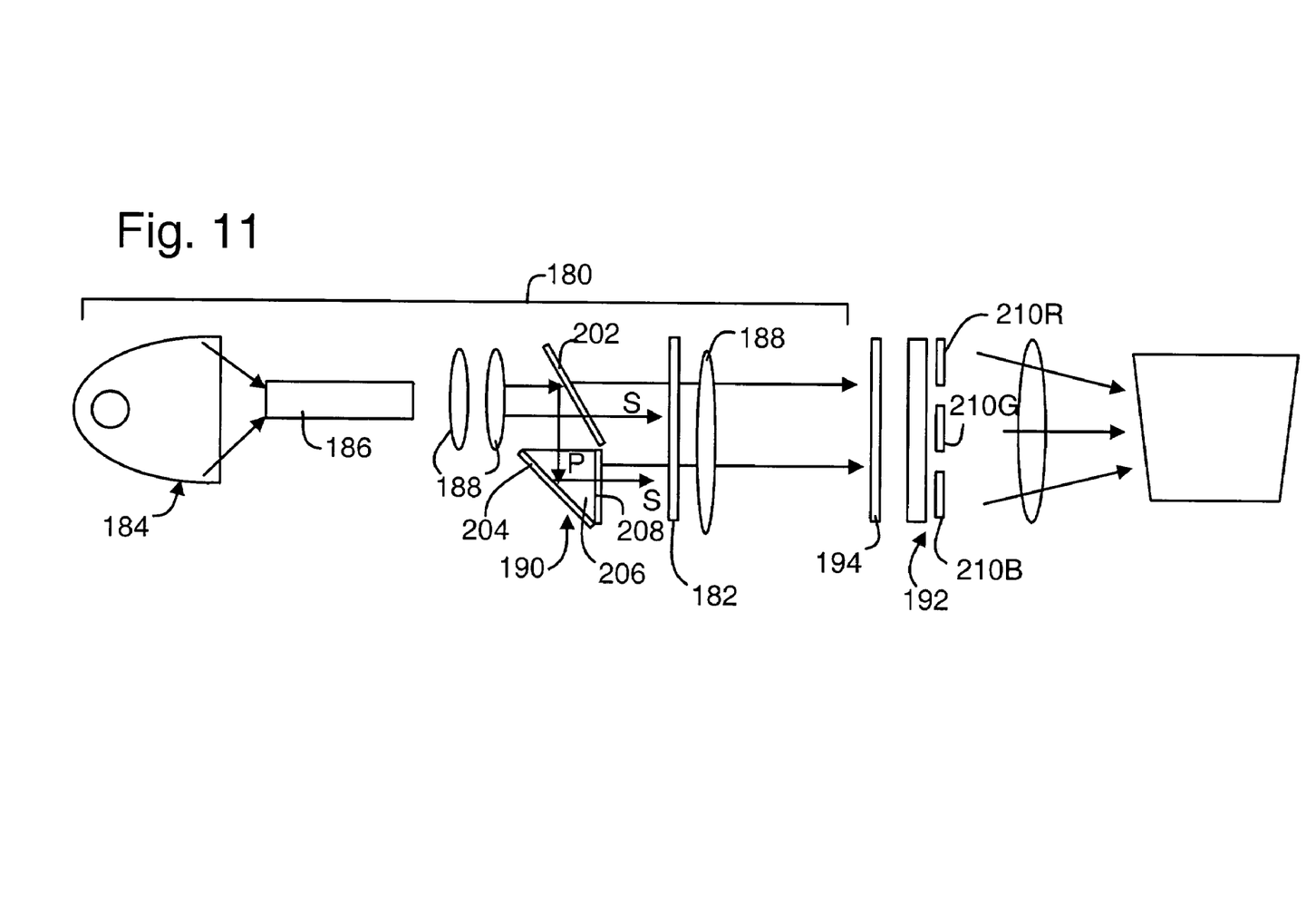
FIG. 11 a simplified illustration of still another implementation of a single-panel LCD projection system with a transmissive optical retarder stack double notch prefilter.

FIG. 11 a simplified illustration of still another implementation of a single-panel LCD projection system 180. An transmissive, optical retarder double notch prefilter 182 receives illumination light from an illumination system 184 via a light pipe integrator 186 (hollow or solid), relay optics 188, and a polarization conversion system (PCS) 190 that generally polarizes the illumination polarized (e.g., along one axis). Illumination integrator 186 increases brightness uniformity of light provided by illumination system 184, and relay optics 188 project the uniform illumination light passing through transmissive double notch prefilter 182 to an LCD 192 with an additional polarizer 194.

For example, PCS 190 includes a supported dielectric film 202 that is polarization selective and generally achromatic. One of S- and P-polarized light is transmitted through dielectric film 202 (e.g., S-polarized light), and the other of the S- and P-polarized light (e.g., P-polarized light) is reflected to a dielectric film 204 on an adjacent inclined face of a prism 206 to be reflected outward through a half-wave retarder 208. Half-wave retarder 208 converts the reflected S-polarized light to P-polarized light, so that all light passing from PCS 190 is of a single polarization (e.g., S-polarization).

In one implementation, double notch prefilter 182 is formed of a stack of stretch plastic films, each with specific retardation value and each at a specific angle, thereby forming a filter that simply rotates some wavelengths (by 90 degrees ideally) and leaves other wavelengths unrotated (or effectively orthogonal to the other band). Transmissive, optical retarder stack double notch prefilter 182 is commercially available from ColorLink, Inc. of Boulder, Colo. An advantage of the retarder stack double-notch prefilter 182 is that it has a relatively large viewing angle over which there is no substantial shift of the edges of the filter bands.

The configuration of LCD projection system 180, namely the positioning of retarder stack double-notch prefilter 182 between polarization conversion system 190 and polarizer 194, allows retarder stack double-notch prefilter 182 to eliminate or reduce the notched wavebands. Polarizer 194, positioned just substantially adjacent LCD 192 also enhances image contrast of projection system 180. In some implementations of projection system 180, LCD 192 with high accuracy color filters 210R, 210G, and 210B may substitute for retarder stack double-notch prefilter 182 a retarder stack-notch prefilter with only one (e.g., yellow) notchband.

Figure 12:
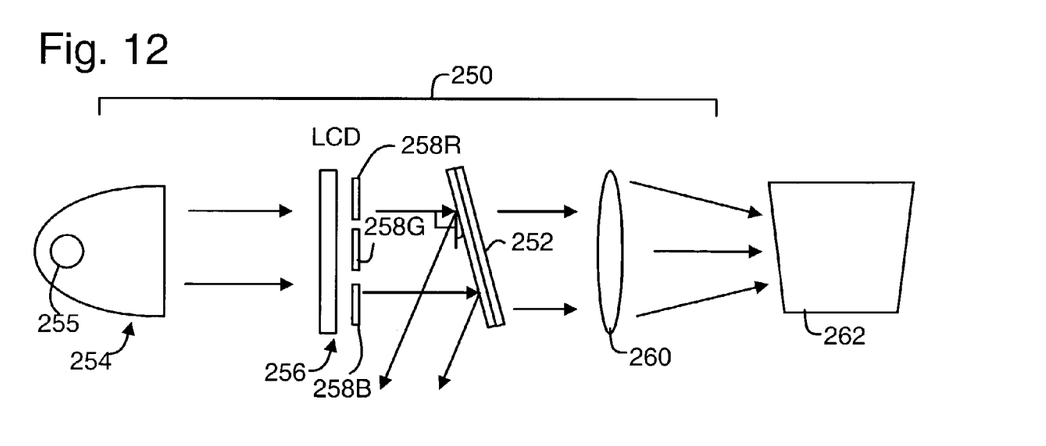
FIG. 12 is a simplified illustration of a single-panel LCD projection system that includes a notch color filter that is positioned after a multi-color liquid crystal display (LCD).

FIG. 12 is a simplified illustration of a single-panel LCD projection system 250 that includes a notch color filter 252 (e.g., a double-notch filter) that is positioned after a multicolor liquid crystal display (LCD) 256. As with implementations described above, projection system 250 includes between an illumination system 254 with a light source 255. LCD 256 includes embedded color filters 258R, 258G, and 258B corresponding to red, green and blue primary color components and an associated polarizer and analyzer (not shown). Notch color filter 252 is positioned between LCD 256 and projection optics 60, which are represented schematically and project the color image to a display screen 262.

Notch color filter 252 functions to shape the spectrum of illumination provided by the combination of illumination system 254 and LCD 256. Notch color filter 252 is selected to eliminate from or greatly reduce in the illumination light the intensity of certain wavebands that do not materially contribute to generating pure primary colors. A consequence of the filtering provided by notch color filter 252 is that the LCD color filters 258 can be desaturated, and the overall total transmission of projection system 250 can be improved. A disadvantage of the positioning of notch color filter 252 after LCD 256 is that some undesirable wavebands may be absorbed by color component filters 258, thereby resulting in some heating of LCD 256. For example, notch color filter 252 can be formed from holographic materials, dichromated gelatin (DCG), as described above.

Typically an LCD rear-projection system uses a 100 W high pressure mercury lamp which outputs around 6000 lumens and can have a lifetime of at least 10,000 hours, a requirement for home television application. The various embodiments of the present invention may be employed in a variety of projection display applications, including color television rear projection systems and various other front and rear projection systems.

In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

The invention claimed is:

1. A liquid crystal display projection system, comprising:
    a transmissive liquid crystal display cell with an associated matrix color filters corresponding to plural primary display colors;
    a light source that directs illumination light toward the liquid crystal display cell; and
    a color prefilter positioned between light source and the liquid crystal display cell to substantially reflect the primary display colors towards the liquid crystal display cell and to absorb or transmit away from the liquid crystal display cell at least one color of light other than the primary display colors.

2. The projection system of claim 1 in which the at least one color of light other than the primary display colors correspond to wavelengths of light between 575 nanometers and 590 nanometers.

3. The projection system of claim 1 in which the at least one color of light other than the primary display colors corresponds to wavelengths of light of between 495 nanometers and 505 nanometers.

4. The projection system of claim 1 in which the color prefilter substantially transmits away two colors of light other than the primary display colors.

5. The projection system of claim 4 in which on of the two colon of light other than the primary display colors corresponds to wavelengths of light between 575 nanometers and 590 nanometers.

6. The projection system of claim 4 in which one of the two colors of light other than the primary display colors corresponds to wavelengths of light between 495 nanometers and 505 nanometers.

7. The projection system of claim 4 in which the two colors of light other than primary display colors corresponds to wavelengths of light of about 500 nanometers and about 585 nanometers.

8. The projection system of claim 1 in which the plural primary display colors correspond to the colors red, green and blue.

9. The projection system of claim 1 included in a color television rear projection system.

10. In a liquid crystal display projection system having a transmissive liquid crystal display cell with an associated matrix of color filters corresponding to plural primary display colors, and a light source that directs illumination light toward the liquid crystal cell, a method of increasing display brightness, comprising:
color prefiltering the illumination light as it passes between the light source and the liquid crystal cell to substantially reflect the primary display colors towards the liquid crystal display cell and to absorb or transmit away from the liquid crystal cell at least one color of light other than the primary display colors.

11. The method of claim 10 in which the color prefiltering includes substantially transmitting away a color of light with wavelengths between the wavelengths of two primary display colors.

12. The method of claim 10 in which the color prefiltering includes substantially transmitting away two colors of light, each with wavelengths between the wavelengths of a different pair of the primary display colors.

13. A liquid crystal display projection system, comprising:
a transmissive liquid crystal display cell with an associated matrix color filters corresponding to plural primary display colors;
a light source that directs image illumination light toward the liquid crystal display cell;
a display screen that receives the image illumination light from the liquid crystal display cell to render a display image; and
a color filter positioned to substantially reflect the primary display colors towards the liquid crystal display cell and to absorb or transmit away from the liquid crystal display cell at least one color or light other than the primary display colors.

14. The projection system of claim 13 in which the color filter is positioned between light source and the liquid crystal display cell.

15. The projection system of claim 1 in which the color prefilter is tilted at an angle of incidence to reflect the primary display colors at inclined angle through a collimating lens towards the liquid crystal display cell.

* * * * *

UNITED STATES PATENT AND TRADEMARK OFFICE
CERTIFICATE OF CORRECTION

PATENT NO.       : 7,015,991 B2                                        Page 1 of 1
APPLICATION NO.  : 10/302405
DATED            : March 21, 2006
INVENTOR(S)      : Conner, Arlie R.

It is certified that error appears in the above-identified patent and that said Letters Patent is hereby corrected as shown below:

In Col. 3, line 45, after "86B at" delete "at".

In Col. 8, line 59, Claim 2, delete "correspond" and insert -- corresponds --, therefor.

In Col. 9, line 1, Claim 5, delete "on" and insert -- one --, therefor.

In Col. 9, line 2, Claim 5, delete "colon" and insert -- colors --, therefor.

In Col. 10, line 28, Claim 15, after "colors at" insert -- an --.

Signed and Sealed this

Eleventh Day of July, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,015,991 B2 |
| APPLICATION NO. | : 10/302405 |
| DATED | : March 21, 2006 |
| INVENTOR(S) | : Conner, Arlie R. |

It is certified that error appears in the above-identified patent and that said Letters Patent is hereby corrected as shown below:

On the title page, Col. 1, under "(75) Inventors", second line, delete "Kinglsey" and insert -- Kingsley --.

Signed and Sealed this

Nineteenth Day of September, 2006

JON W. DUDAS
*Director of the United States Patent and Trademark Office*